3,449,132
ONION RINGS
Anthony J. Luksas, Chicago, and Robert H. Bundus, Riverside, Ill., assignors to Beatrice Foods Co., Chicago, Ill., a corporation of Delaware
No Drawing. Filed Feb. 24, 1965, Ser. No. 435,060
Int. Cl. A23l 1/00
U.S. Cl. 99—100
14 Claims

ABSTRACT OF THE DISCLOSURE

Crisp, non-greasy onion rings are prepared by frying onion rings with a batter comprising (a) 2–32% of nonfat milk solids or lactose, (b) 10–75% flour, (c) 0.5–5% fat, (d) 30–70% water, (e) 1–30% soy protein or dextrin, (f) 0.03–0.1% of sorbitan higher fatty acid ester and 0.03–0.1% of mono and diglycerides higher fatty acid ester.

The preferred higher fatty acid esters are oleates since they give the least greasy onion rings.

---

The present invention relates to fried onion rings.

Commercial canned fried onion rings have a greasy appearance and a heavy fat taste. Also in preparing the fried onion rings it is necessary to soak the onion rings in milk to cause the batter or flour to adhere to the sliced onion rings.

It is an object of the present invention to prepare crisper fried onion rings.

Another object is to provide fried onion rings having a lower fat content.

A further object is to provide onion rings having a less fatty taste.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing a batter containing a plurality of emulsifying agents. One of the emulsifying agents is a sorbitan ester of a higher fatty acid, e.g. sorbitan monooleate or sorbitan monostearate and the other is a mono and diglyceride ester of a higher fatty acid, e.g. mono and diglycerides of oleic acid and mono and diglycerides of stearic acid. The preferred mixture of emulsifiers is sorbitan monooleate with the mixture of mono and diglycerides of oleic acid. Tween 80 is a commercially available form of sorbitan monooleate and Atmos 300 is a commercially available form of mono and diglycerides of oleic acid.

The Tween 80 is used in an amount of 0.03 to 1% of the fat content of the finshed product and the Atmos 300 is also used in the range of 0.03 to 1% of the fat content of the finished product.

The combination of emulsifiers causes a repulsion of fat and is the key to the low fat content in the final product. The mixture applied to the onion rings is between an oil-in-water emulsion and a water-in-oil emulsion.

Unless otherwise indicated all parts and percentages are by weight.

The batter employed has the following composition:

|  | Percent |
| --- | --- |
| Nonfat milk solids | 2–32 |
| Flour (wheat or rye) | 10–75 |
| Sodium chloride | ([1]) |
| Fat | 0.5–5 |
| Water | 30–70 |
| Atmos 300 | 0.03–0.3 |
| Tween 80 | 0.03–0.3 |
| Promine D (washer soya protein) | 1–30 |

[1] Small amount for flavor, not critical.

The fat is added to the batter to improve crispness. Reduction in the amount of fat increases the hardness of the batter and increase in the fat makes for a crisper product. The fat used is normally the same fat employed in the frying, e.g. hydrogenated cottonseed oil, hydrogenated corn oil, hydrogenated soya bean oil, coconut oil, corn oil and cottonseed oil. The solid oils are preferred because the onion rings have a dry appearance. However, any available cooking oil or fat can be used.

In place of the non-fat milk solids and water there can be used whole milk or skim milk to supply these two ingredients. Also lactose can be used in place of the nonfat milk solids.

In place of soy protein, less preferably there can be used dextrin, e.g. from starch or rice.

The wheat or rye flour is added to give body to the product. The soy protein can be omitted but the product is soggy if this material (or dextrin) is not included.

It is important that enough water be present (either added as such or as whole or skim milk) to ensure the enrobing of the onion rings, at least in part the success of the present invention is due to the enrobing character of the batter.

The batter employed in the present invention absorbs excess oil on itself and the finished product does not appear oily. Additionally, the finished product is crisper than commercial canned onion rings and has a better flavor. The batter preferably has a viscosity of 15,000–16,000 centipoises (at room temperature) and during the frying the batter does not disintegrate in the oil.

According to the present invention either the sliced onion rings can be thrown on the batter or alternatively the onion can be placed in the batter and then fried.

The normal procedure for carrying out the invention to place all the ingredients of the batter except the fat and emulsifiers in a mixer. When a well dispersed mixture is obtained there is added a mixture of the fat and emulsifiers heated to liquid condition. Alternatively, the entire batter can be heated to the melting point of the fat, in which case the fat and emulsifiers can be added at an earlier point. Also the batter components can be agglomerated by dry mixing or dried from a liquid state, e.g. by spray drying or roller drying. In this case the powder is simply dispersed in water and used.

The onion rings coated with the batter are then fried in fat at conventional temperature, e.g. 325° F. However, much less fat is absorbed than is normally the case. Thus in one example, according to the invention, the finished fried onion rings contained only 27.4% of fat as compared with 45.8% and 38.2% for two different brands of commercially available canned fried onion rings.

The fried onion rings of the present invention can then be canned or frozen for storage and subsequents sale.

In general the fried onion ring products of the present invention contain 25–32% fat. A typical analysis of fried onion rings made according to the invention is fat 27.4%, batter solids (non-fat) 61.3%, onion solids 8.2%, moisture 3.1%.

Example 1

The fat used in this example was hydrogenated cottonseed oil, M.P. 110° F. and containing 0.05% isopropyl citrate as a stabilizer.

To a mixing bowl there was added 8.08 parts of non-fat milk solids, 32.6 parts of wheat flour, 0.78 parts of salt, 54.4 parts of water and 2.2 parts of washed soy protein (Promine D). The mixture was thoroughly dispersed. In the meantime, 2.33 parts of fat were heated with 0.15 part of mono and diglycerides of oleic acid (Atmos 300 which contains 40–42% of the mono glyceride) 43–45% of the diglyceride and the balance triglyceride of oleic acid) and 0.15 part of sorbitan monooleate (Tween 80). When the fat was liquified it was added to the rest of the batter ingredients in the mixing bowl. The sliced onion rings were dipped in the batter and then fried at 325° F. in hydrogenated cottonseed oil, M.P. 110° F. to give final fried onion rings which were crisp and had a relatively light fat taste and good flavor as compared with commercial canned onion rings and did not have a greasy appearance. The fried onion rings analyzed:

| | Percent |
|---|---|
| Milk solids | 11.5 |
| Flour solids | 46.2 |
| Salt | 2.2 |
| Mono- and diglycerides | 0.21 |
| Sorbitan monooleate | 0.21 |
| Soy protein | 2.2 |
| Onion solids | 8.2 |
| Fat | 27.3 |
| Moisture | 2.0 |

Example 2

The procedure of Example 1 was repeated but the nonfat milk solids and water were replaced by 62.5 parts of skim milk to produce fried onion rings similar to those obtained in Example 1.

Example 3

A mixture of 12 parts of non-fat milk solids, 45 parts of flour solids, 0.5 part of salt 4 parts of Promine D and 50 parts of water were mixed together and there was added 2.5 parts of liquefied hydrogenated cottonseed oil (M.P. 110° F.), 0.2 part of Tween 80 and 0.19 part of Atmos 300. This mixture was then spray dried. The resulting spray dried product was reconstituted with 45 parts of water, the resulting batter thrown on sliced onion rings and the rings fried at 325° F. in hydrogenated cottonseed oil.

What is claimed is:

1. A process of preparing crisp non-greasy onion rings comprising frying the onion rings in a fat after coating the onion rings with a batter comprising (a) 2–32% of a member of the group consisting of nonfat milk solids and lactose, (b) 10–75% flour, (c) 0.5–5% fat, (d) 30–70% water, (e) 1–30% of a member of the group consisting of soy protein and dextrin (f) 0.03–0.1% of sorbitan higher fatty acid ester and 0.03–0.1% of mono and diglycerides higher fatty acid ester.

2. A process of preparing crisp non-greasy onion rings comprising frying the onion rings in a fat after coating the onion rings with a batter comprising 2–32% of nonfat milk solids, 10–75% flour, 0.5–5% fat, 30–70% water, 1–30% soy protein, 0.03–0.3% sorbitan monooleate and 0.03–0.3% mono and diglycerides oleate.

3. A process according to claim 2 wherein the non-fat milk solids and water are replaced by 32–80% of skim milk.

4. A process according to claim 2 wherein the nonfat milk solids and water are replaced by 32–80% of whole milk.

5. A process according to claim 2 in which the fat is solid at room temperature.

6. A process comprising emulsifying a fat with a mixture of 0.03 to 1% sorbitan monoleate and 0.03 to 1% of mono and diglycerides oleate, adding the thus emulsified fat in an amount of 0.5 to 5 parts to a mixture of 2–32 parts of non-fat milk solids, 10–75 parts flour, 30–70 parts water and 1–30 parts of soy protein, to form a batter coating onion rings with the batter and frying the coated onion rings to produce fried onion rings having not over 32% fat.

7. A process according to claim 9 wherein the non-fat milk solids and water are replaced by skim milk.

8. A process according to claim 6 wherein the nonfat milk solids and water are replaced by whole milk.

9. A process according to claim 6 wherein the batter is dried and then is reconstituted in water prior to being applied to the onion rings.

10. A process according to claim 9 wherein the drying is spray drying.

11. A process according to claim 9 wherein the fat is solid at room temperature.

12. A process according to claim 11 wherein the fat is hydrogenated cottonseed oil.

13. A process according to claim 6 wherein the batter comprises 8 parts nonfat milk solids, 32.6 parts wheat flour, 0.78 parts salt, 54.4 parts water, 2.33 parts hydrogenated cottonseed oil, 0.15 part sorbitan monooleate, 0.15 part mono and diglyceride oleate and 2.2 part soy protein.

14. Crisp, non-greasy fried onion rings, said fried onion rings having been produced by the process of claim 1.

References Cited

UNITED STATES PATENTS

| 3,027,258 | 3/1962 | Markakis et al. | 99—100 |
| 2,771,370 | 11/1956 | Allen | 99—100 |

A. LOUIS MONACELL, *Primary Examiner.*

J. M. HUNTER, *Assistant Examiner.*

U.S. Cl. X.R.

99—168